Sept. 23, 1958  J. GULDEMOND  2,853,151
ELECTRIFIED CENTRIFUGAL DUST SEPARATING DEVICE
Filed Dec. 6, 1955  2 Sheets-Sheet 2
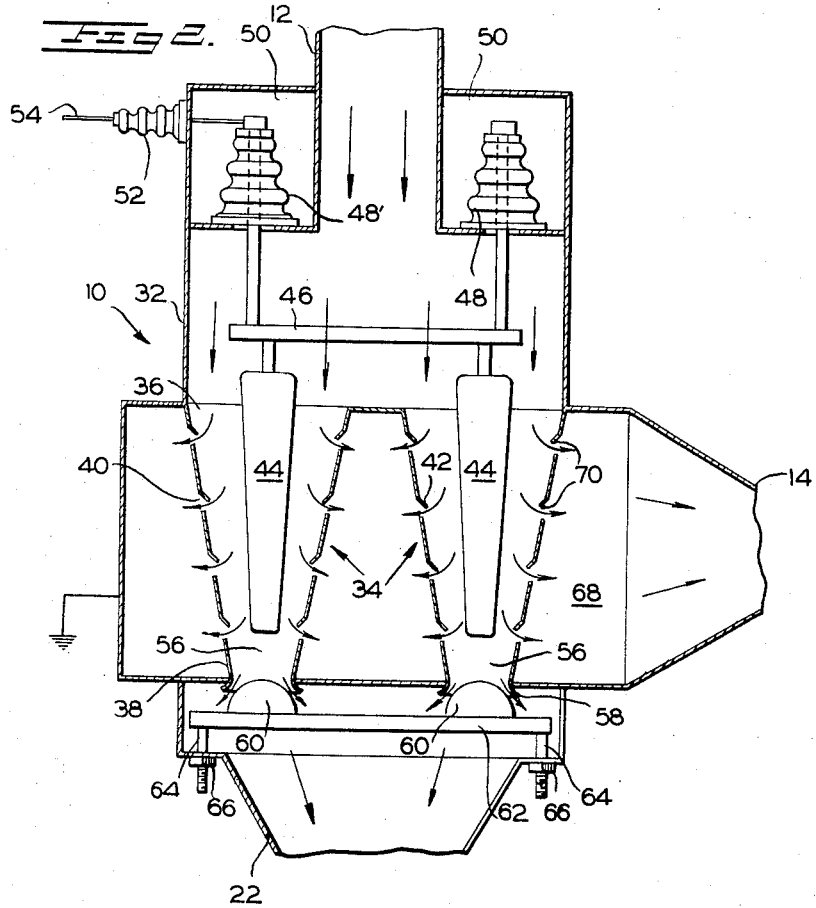
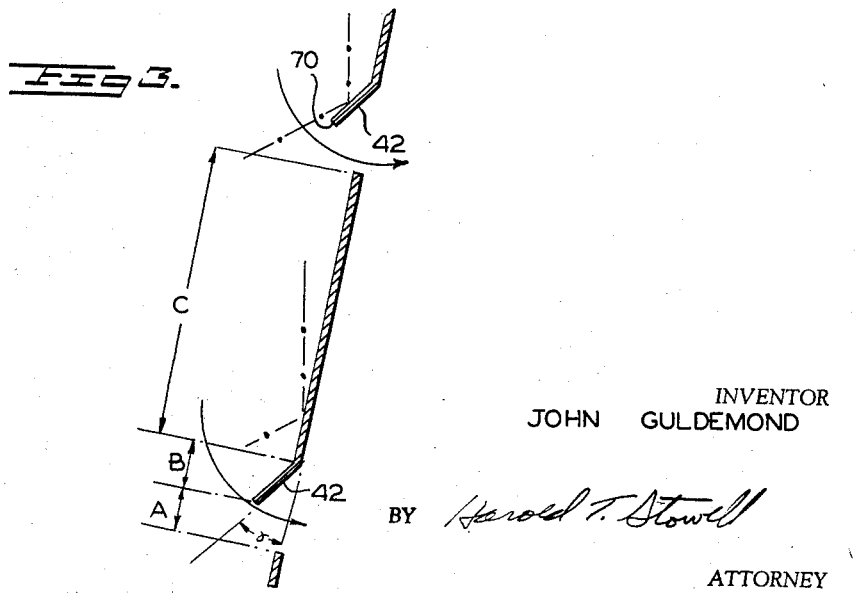
INVENTOR
JOHN GULDEMOND
BY *Harold T. Stowell*
ATTORNEY

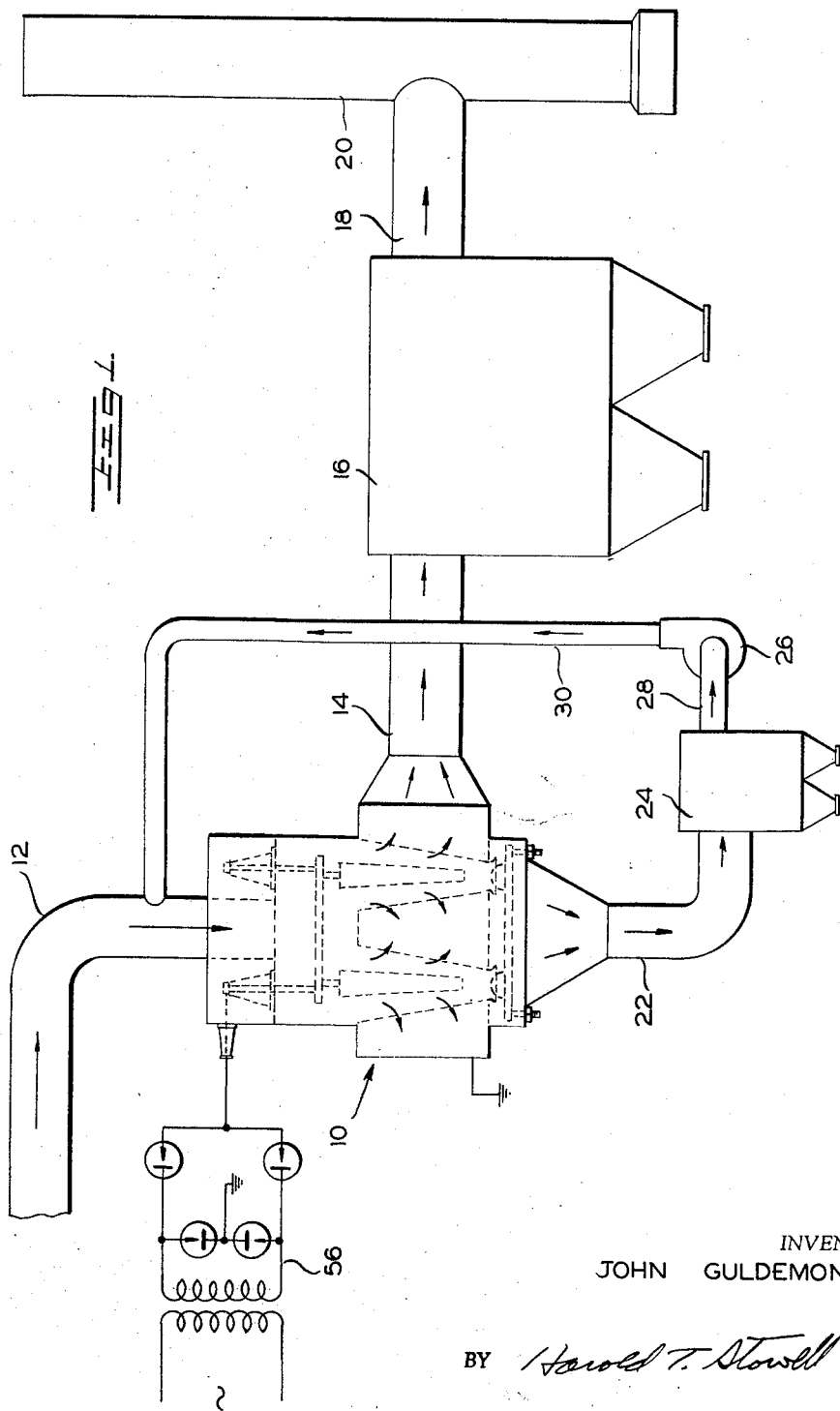

United States Patent Office 2,853,151
Patented Sept. 23, 1958

2,853,151

ELECTRIFIED CENTRIFUGAL DUST SEPARATING DEVICE

John Guldemond, Bound Brook, N. J., assignor to Research Corporation, New York, N. Y., a corporation of New York Application December 6, 1955, Serial No. 551,415

2 Claims. (Cl. 183—7)

This invention relates to new and improved apparatus for separating suspended particulate material from gas streams, and in particular to a new and improved electrified centrifugal type dust separator.

Mechanical, centrifugal concentrators of the type which include an elongated conical separator chamber having a plurality of louvered slots in the wall thereof are well known in the art.

Such cone shaped mechanical dust concentrators derive their concentrating ability from the principle that when dust laden air is propelled into the mouth of the cone dust particles by nature of their mass and velocity are unable to turn and pass out of the louvered slots but impinge on the inner surface of the cone and rebound into the throat thereof. The gaseous component of the aerosol, however, by nature of its fluid flow characteristics readily flows through the louvered portions of the cone permitting the withdrawal at the lower end thereof of a small portion of the initial gas stream containing a large portion of the suspended particulate material.

It has been found that if some additional form of energy is imparted to the particulate material of the aerosol entering the cone to propel the particles toward the center thereof a very effective means of separating fine as well as coarse particles is obtained.

It is therefore a primary object of the present invention to increase the effectiveness and the efficiency of conical, louvered type mechanical dust concentrators by applying a high intensity electrostatic field to the region within the separator tube.

It is a further object of this invention to provide an electrostatic, mechanical dust collector of the conical type wherein the concentrated dust discharged end of the cone is free of corona discharge points whereby when the concentrated particles reach the lower end, "pith ball," action suspends the collected particles in the blow down portion of the gas stream.

A further object is to provide an adjustable baffled outlet at the throat of the blow down gas discharge section of such conical separator tubes whereby various percentages of blow down may be obtained.

A further object is to provide such an electrified mechanical dust separator wherein the louvered slots are shaped and positioned to provide maximum dust collecting efficiency.

These and other objects and advantages of the present invention are provided in a combination centrifugal and electrostatic separating apparatus which generally comprises a separator duct having a dirty gas inlet and a concentrated particulate material outlet tapering inwardly from the inlet to the outlet, the wall of the duct having a plurality of parallel peripherally extending louvered slots, the louvers thereof sloping inwardly of the duct toward the narrow duct end, an extended surface electrode concentrically positioned within the duct and insulated therefrom, the electrode having a substantially smooth outer surface and tapering inwardly throughout its length from the gas inlet end of the duct, and means connecting the extended surface electrode and the wall of the separator duct to a source of a high voltage unidirectional current for establishing corona discharge from the inner edges of the louvers to the extended surface electrode.

The invention will be more particularly described with reference to the illustrated embodiments thereof wherein:

Fig. 1 is a diagrammatic view of the novel combined mechanical electrostatic separator of the present invention incorporated in a dust separating system;

Fig. 2 is an enlarged vertical sectional view of a preferred form of the apparatus of the present invention; and Fig. 3 is an enlarged fragmentary view of a preferred form of louvered slot constructions of the present invention.

Referring to Fig. 1 of the drawings 10 generally designates the new and improved electrified mechanical dust separator of the present invention which is provided with an inlet duct 12 for directing a stream of gas containing suspended particulate materials into the separator. The major portion of the gas stream, having a substantial portion of the suspended particles separated therefrom, issues from the separator through conduit 14 and passes through a standard electrostatic precipitator generally designated 16 and thence through duct 18 to a discharge stack 20.

The small portion of the gas entering the separator through duct 12 and containing a substantial portion of the particulate material suspended therein issues from the separator through conduit 22 and then passes to a secondary electrostatic precipitator of conventional construction generally designated 24. The gas issuing from the secondary precipitator 24 may be reconveyed as shown in Fig. 1 to the dirty gas inlet 12 by blower 26 and conduits 28 and 30.

Referring particularly to Figs. 2 and 3 of the illustrated embodiments of the invention the novel electrified centrifugal separator 10 generally comprises a housing 32 having positioned therein a plurality of conical separator tubes 34. Each separator tube 34 tapers generally inwardly from the inlet end 36 to the concentrated particulate material outlet end 38.

Starting slightly below the inlet 36 and ending above the concentrated material outlet 38 the walls of the separator tubes 34 are provided with a plurality of louvered slots 40 which slots are positioned substantially perpendicular to the axis of the ducts and parallel to each other. The louvers 42 of the louvered slots slope generally inwardly of the duct toward the discharge end 38. It has been found experimentally that the form and the shape of the louvered slots in relation to each other and to the surface of the cone are very critical if high collecting efficiencies are to be obtained. For example, it has been found that most efficient collection exists when the louvers 42 are positioned at an angle of from about 35° to about 45° to the collector wall and preferably at about 37° to about 42° (the slope angle being designated α in Fig. 3 of the drawings); if the louver openings A are about ⅜ of an inch and are substantially equal to the perpendicular projection of the louver length B; and if the distance C between adjacent louvered slots is equal to about 10 or 12 times the louver openings A as diagrammatically shown in Fig. 3 of the drawings.

With this form of construction it has been found that a greater portion of the particulate material carried by the gas stream rebound toward the center of the conical collector without passing out the louver openings A.

Within each of the separator tubes 34 is provided a conical extended surface electrode 44 having a smooth outer surface. The electrodes 44 are suspended from a suitable electrode frame 46 carried by insulators 48 and 48' housed in compartments 50 and 50' adjacent the upper end of the housing 32. The compartment 50' is provided with an inlet bushing 52 for directing a high voltage uni-directional current to the electrodes 44 through electrical conduits 54 from a source of high voltage uni-directional current 56 shown in Fig. 1 of the drawings.

As more clearly shown in Fig. 2 of the drawings the electrodes terminate above the particulate material discharge end of the separator tubes 34 to provide a zone 56 which is free of corona discharge.

It has further been found that for most efficient operation it is necessary to vary the proportion of blow down gas to inlet gas depending upon the nature and size of the suspended particulate material to be separated. Very effective control of the blow down gas is obtained by flaring the outlet end of each separator tube 34 as at 58 and adjustably mounting a substantially dome shaped outlet restrictor adjacent the flared portion thereof. As shown in Fig. 2 such dome shaped restrictors 60 are mounted on platforms 62 carried by threaded rods 64 which pass through the lower end of the housing 32 and are provided with nuts 66 for adjusting the vertical position of the platform 62 and their connected dome shaped restrictors 60 relative to the flared outlets 58.

In operation of the present invention extended surface electrodes 44 are energized with a high positive potential and the cones 34 of the separators are energized with a negative potential. A gas stream containing suspended particulate material is directed into the housing 32 through the inlet duct 12 where it passes downwardly into the tapered cones 34. The major portion of the gas stream entering the cones 34 turns as shown by the directional arrows and passes out of the louvered slots 40 where the gas is collected in a header 68 to pass out of the outlet conduit 14.

The particles suspended in the gas stream, due to their mass and the velocity, impinge upon the inner surface of the ducts 34 and the inner surface of the louvers 42 where they are caused to rebound toward the central electrodes 44. In order to prevent particles impinging upon the louvers and the inner walls of the separator tubes from passing out of the slots with the air stream, corona discharge from the edges 70 of the louvers 42 to the extended surface electrodes 44 drive the particles away from the slotted openings and toward the electrodes 44, whereby the portion of the gas stream passing out the restricted outlets 38 contains a relatively high portion of the suspended particulate material.

In order to prevent build-up of suspended particles upon the extended surface collecting electrodes 44, the velocity of the gas stream passing through the separator tubes 34 is maintained sufficiently high so that the electrodes are swept clean.

As hereinbefore described both the electrodes 44 and the louvered slots 40 terminate above the concentrated particulate material discharge zone 56 so that this area is free of corona discharge points. When the concentrated collected particles reach zone 56 "pith ball" action takes place suspending the collected particles in the blow down portion of the gas stream. By means of the adjustable dome shaped restrictors 62 the percentage of blow down gas is maintained at from about 5 to about 15 percent of the total gas volume being treated.

The blow down portion, containing the concentrated particulate material, passes out of the housing 32 through conduit 22 and thence to a secondary electrostatic dust collector 24. The gas stream leaving the secondary collector can be directed by conduits 28 and 30 and blower 26 to the dirty gas inlet duct 12 ahead of the electrified mechanical separator.

As previously described the gas stream, depleted of a substantial portion of the particulate material, which passes through the louvered openings 40 is collected in the header 68 and passes through a primary electrostatic precipitator of conventional construction through duct 14 and from the electrostatic precipitator 16 to a discharge stack 20 through conduit 18.

From the foregoing description it will be seen that the present invention fully accomplishes the aims and objects of substantially increasing the effectiveness and the efficiency of louvered type centrifugal dust concentrators by applying a high intensity electrostatic field to the region within the separator for propelling the suspended particles toward the center of the cone and away from the slotted openings through which the substantially particle depleted gas is directed.

I claim:

1. A combination centrifugal and electrostatic dust separating apparatus comprising a separator duct having a dirty gas inlet and a concentrated particle material outlet tapering inwardly from the inlet to the outlet, the wall of the duct having a plurality of parallel peripherally extending louvered slots, the louvers thereof sloping inwardly of the duct toward the outlet at an angle of from about 35° to about 45° to the duct wall, an elongate substantially conical collector electrode means disposed concentrically within said duct and insulated therefrom, said conical electrode having an impervious substantially smooth outer surface tapering inwardly throughout its length from the inlet to the outlet of said duct whereby the apex thereof is disposed away from dirty gas inlet, and means for connecting said collector electrode and said louvers to a source of electrical energy for establishing corona discharge from the inner portions of said louvers to said collector electrode whereby a majority of the foreign particles in the transient gas may be effectively attracted to said collector electrode subsequent to the point where the transient gas is caused to sharply change its direction of flow and pass through said louvers causing additional particles to be expelled from the gas toward said outlet.

2. The invention as defined in claim 1 wherein the distance between adjacent louvered slots is from about 10 to about 12 times the slot width.

References Cited in the file of this patent

UNITED STATES PATENTS

| 1,034,668 | Wright | Aug. 6, 1912 |
| 2,069,483 | Skajaa | Feb. 2, 1937 |
| 2,142,128 | Hoss et al. | Jan. 3, 1939 |
| 2,700,429 | Wintermute | Jan. 25, 1955 |

FOREIGN PATENTS

| 129,415 | Sweden | July 6, 1950 |
| 699,670 | Great Britain | Nov. 11, 1953 |